March 25, 1969    A. D. WHITE    3,435,371
LASER MODE SELECTION APPARATUS
Filed Dec. 17, 1965

INVENTOR
A. D. WHITE
BY
*Roderick B. Anderson*
ATTORNEY

TEM$_{01}$ MODE PATTERN ON M$_2$ - M$_3$

United States Patent Office 3,435,371
Patented Mar. 25, 1969

3,435,371
LASER MODE SELECTION APPARATUS
Alan D. White, Berkeley Heights, N.J., assignor to Bell Telephone Laboratories Incorporated, New York, N.Y., a corporation of New York
Filed Dec. 17, 1965, Ser. No. 514,488
Int. Cl. H01s 3/09, 3/00
U.S. Cl. 331—94.5
9 Claims This relates to lasers, and more particularly to cavity resonators for use in laser apparatus.

As is known, the laser, or optical maser, is capable of generating and amplifying coherent light through the stimulated emission of radiation within a laser medium or a "negative temperature" medium. As used herein, the term light is intended to include infra-red, ultra-violet, and any other frequencies to which the principles to be described are applicable. An important element of a laser, or at least of a laser oscillator, is an optical cavity resonator for repeatedly directing the radiated light through the laser medium for cumulative gain. Optical cavities need not be used in laser amplifiers if a single pass of the light beam through the laser medium provides the desired amplification.

The usual optical cavity resonator includes a pair of mirrors located on opposite sides of the laser medium along the axis of the light beam. One of the mirrors is partially transparent to permit light energy to be derived from the laser apparatus. The mirrors are separated by an integral number of half wavelengths for making the optical cavity resonant at the desired optical frequency.

Because of the high frequency of light, the optical cavity must necessarily be many thousands of wavelengths long, and because of this it is inherently resonant at many frequencies. Many of these resonant frequencies are amplified by the laser medium and derived along with the desired frequency. Various devices have been proposed for suppressing undesired oscillatory modes so that light energy of only a single frequency or predominantly of a single frequency can be derived from the apparatus. In the copending application of A. G. Fox, Ser. No. 466,365, filed June 23, 1965 and Edwards et al., Ser. No. 466,366, filed June 23, 1965, mode suppression apparatus is described which includes a light beam splitter for reflecting part of the light energy against a third mirror. By properly orienting the beam splitter mirror and the third mirror in any of various alternative ways, optical resonances can be established for suppressing undesired modes. One drawback of these arrangements is that the location of the beam splitter is very critical; if its position varies by a distance approaching a wavelength of light, the optical resonance of the cavity may be subtially changed.

One embodiment of the present invention comprises a first mirror and a second mirror located on opposite sides of a laser medium for forming a primary laser optical cavity. Located between the laser medium and a second mirror is a birefringent medium for splitting the optical laser beam into two components. One component is transmitted freely through the medium toward the second mirror, while the other component is refracted and displaced substantially from the central axis of the primary optical cavity. The displaced component is directed against a third mirror which forms with the first mirror an auxiliary cavity resonator. The auxiliary cavity is an integral number of half wavelengths longer than the primary cavity at the desired frequency.

Located betwen the birefringent medium and the laser medium is a Brewster angle window, which, as is known, will transmit with low loss only linearly polarized light having parallel electric field components in one plane. The birefringent medium will then split the linearly polarized light into two components having electric field vectors that are at right angles to each other. When the components are reflected back through the birefringent medium from the second and third mirrors, they will recombine to form linearly polarized light only if they are in phase. Out-of-phase light will, upon recombination, be elliptically polarized and will therefore be attenuated by the Brewster angle window. In-phase recombination will occur only at frequencies at which both the primary and auxiliary cavities are resonant and so it is possible to develop a single frequency which will both be amplified and will propagate with low loss. Further details of the optical lengths and resonant frequencies of the cavities for developing only one light frequency that will be freely transmitted through the Brewster angle window and be amplified by the laser medium, will be described later.

In another embodiment of the invention, the birefringent medium constitutes a Wollaston prism which provides an angular separation of the two light beam components rather than merely a displacement. In still another embodiment, a Wollaston prism is used to split the beam into two components with separate laser mediums being included along the two separate beam paths for increasing the gain of the selected mode frequency. Both of these alterantive embodiments suppress unwanted modes through attenuation by a Brewster angle window as described before.

In still another embodiment, an aperture is included between the first mirror and the laser medium of a proper diameter for defining a symmetrical higher order transverse mode of oscillation at the desired frequency. The first mirror only intercepts half of the light beam with the remainder going to the second mirror. As before, both the primary and auxiliary cavities are resonant at the desired frequency. Since higher order transverse modes of odd symmetry have zero field intensity along the center line of the light beam, the edge of the second mirror along the beam center line will not attenuate the desired mode. The second mirror will, however, present a discontinuity to other non-symmetric modes and will suppress them. Energy reflected from the third mirror at the desired frequency will recombine in-phase as before and will grow with repeated passes through the laser medium.

These and other features and advantages of my invention will be better appreciated from a consideration of the following detailed description taken in conjunction with the accompanying drawing in which.

Figure 1:
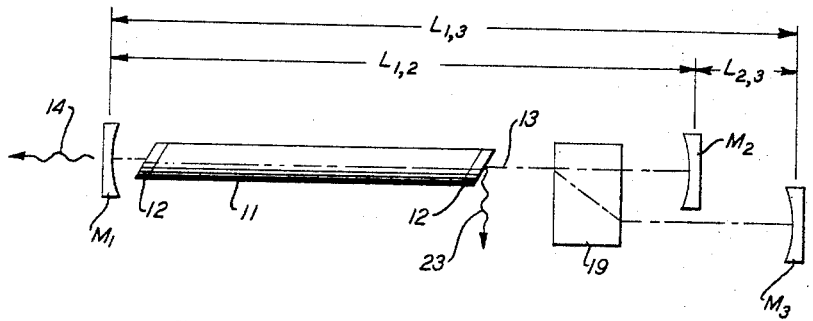
FIG. 1 is a schematic illustration of laser apparatus in accordance with one embodiment of the invention.

Referring now to FIG. 1, there is shown an illustrative embodiment of the invention comprising a laser 11 which contains an appropriate laser medium for generating or amplifying coherent light through the stimulated emission of radiation. The laser medium may be of any known form, such as a gas through which an electrical discharge is maintained, for example, argon or a helium-neon mixture, or it may be of known solid materials. Opposite ends of the laser define Brewster angle windows 12. Light which is generated or amplified by the laser propagates as a beam along a central or ray axis 13. Located on opposite sides of the laser 11 along the axis 13 are a first mirror $M_1$ and a second mirror $M_2$ which define an optical cavity. When the laser is operated, light is repeatedly reflected through the laser medium by mirrors $M_1$ and $M_2$ so that the intensity of the beam will be cumulatively amplified. Mirror $M_1$ may be partially transparent so that a usable portion of the coherent light designated as 14 may be derived from the laser apparatus.

Figure 2:
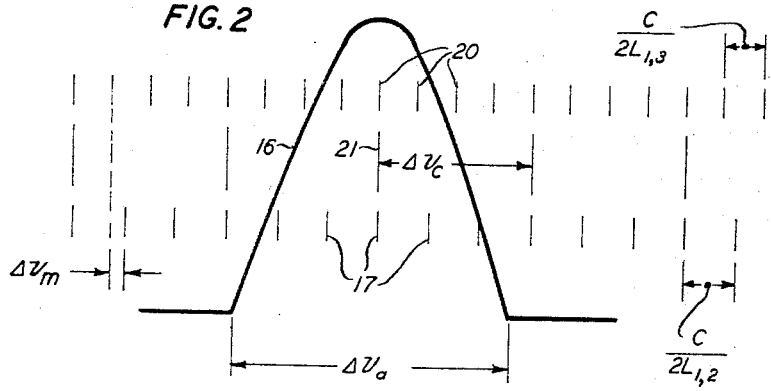
FIG. 2 is a graph showing gain versus frequency in the laser medium of the device of FIG. 1 and the frequency spectra in the optical cavities of the apparatus of FIG. 1.

FIG. 2 shows a gain versus frequency curve 16 together with the resonance spectrum of the primary optical cavity defined by mirrors $M_1$ and $M_2$. The frequency band $\Delta \nu_a$ over which laser gain exceeds cavity loss is known as the oscillation band width. The vertical lines 17 designate frequencies at which the primary cavity of mirrors $M_1$ and $M_2$ is resonant. It can be appreciated that, while it would often be desirable to derive light energy 14 at a single frequency, several of the resonant frequencies 17 lie within the oscillation band width and would therefore ordinarily be amplified and so oscillate in the laser medium.

In accordance with the invention, the apparatus of FIG. 1 includes a birefringent medium 19 and a third mirror $M_3$ for suppressing undesired modes of oscillation. The mirror $M_3$ forms with mirror $M_1$ an auxiliary optical cavity having an optical length $L_{1,3}$ which is an integral number of half wavelengths longer than the optical length $L_{1,2}$ of the primary cavity. The auxiliary cavity is resonant at frequencies 20 shown on the graph of FIG. 2. It can be shown that the frequency separation of resonant frequencies in the auxiliary cavity is equal to $c/2L_{1,3}$ while the frequency separation of modes in the primary cavity is $c/2L_{1,2}$, as illustrated in FIG. 2. Because the primary cavity is shorter, the frequency separation of successive modes is greater than the separation of successive modes in the auxiliary cavity by the factor $\Delta\nu_m$ illustrated in FIG. 2. Hence, all of the resonant modes 20 cannot be of the same frequency as the resonant modes 17 of the primary cavity.

The frequencies 20 will be effectively coincident with the frequencies 17 at periodic intervals separated by a frequency $\Delta\nu_c$ shown in FIG. 2. As will be shown later, only energy at frequencies that are resonant in both the primary and auxiliary cavities will propagate freely without substantial attenuation through the laser apparatus. It is clear that the lengths of the primary and auxiliary cavities can be interchanged without altering the basic principle of oscillation occuring only at coincidences. As shown in FIG. 2, only the frequency 21 represents a coincidence of the frequency modes 17 and 20 which lies within the oscillation band width $\Delta\nu_a$ of the laser medium. Hence, only energy at the frequency 21 will be amplified and the competing modes will be suppressed. Energy at other modes including those within the oscillation band width will be reflected to some extent from the Brewster angle window as shown by the arrow 23 of FIG. 1, and will therefore tend to be attenuated.

Figure 3:
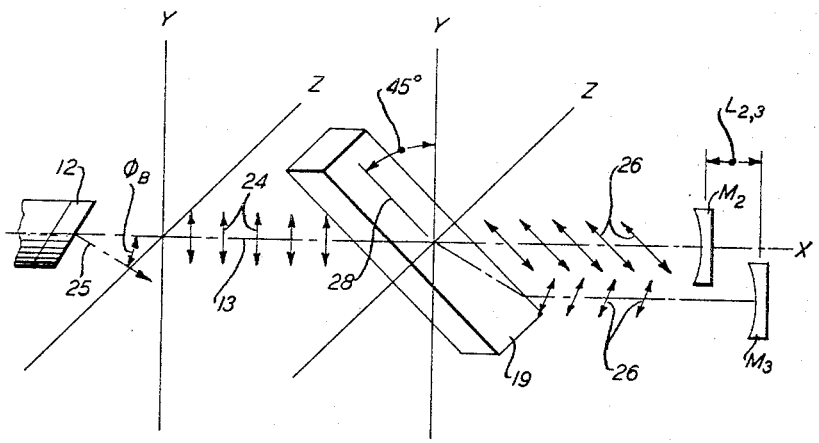
FIG. 3 is a schematic representation of part of the apparatus of FIG. 1 which illustrates relative light beam polarizations.

FIG. 3 illustrates the mechanism of suppression of unwanted modes. Light which is transmitted from the laser medium through the Brewster angle window 12 is predominantly linearly polarized with electric field vectors 24 extending in a plane defined by the central axis (or ray path) 13 and the normal 25 to the Brewster angle window. The angle $\varphi_B$ is the Brewster angle. The birefringent medium 19 splits the light beam into two components having respective electric field vectors 26 at right angles to each other. With the optical distance $L_{2,3}$ between mirrors $M_2$ and $M_3$ an integral number of half wavelengths long at the desired frequency, energy at this frequency which is reflected from the two mirrors will again pass through the birefringent medium 19 and recombine in-phase to form linearly polarized light having vectors in the direction shown by vectors 24. It will therefore be freely transmitted through the Brewster angle window and become amplified as is desired. Light of other frequencies, that is, light for which the distance $L_{2,3}$ does not represent an integral number of half wavelengths, will be recombined at the birefringent medium 19 out-of-phase. The recombination of out-of-phase orthogonal electric field vectors will form light having elliptical polarization rather than linear polarization. As a result, it will be attenuated by the Brewster angle window and will not be cumulatively amplified as is energy at the desired frequency.

It can be seen that this embodiment is based on the principle that a Brewster angle window will transmit linearly polarized light having electric fields in a specific plane more efficiently than light of any other polarization. In order to enhance this effect, it is advantageous that the birefringent medium split the light beam into approximately equal intensity components. This is accomplished by orienting the principal axis 28 of the birefringent medium at an angle of approximately 45 degrees with respect to the direction of the electric field vectors 24. X, Y, and Z axes have been included in FIG. 3 merely for purposes of conventional reference.

The birefringent medium 19 displaces part of the light energy because it presents a different index of refraction to the two components of different polarization. The medium 19 is preferably calcite which has a large difference of index of refraction although other materials could be used, such as sodium nitrate and quartz. The axial length of the medium 19 should be long enough to give a usable displacement between the two light components so that they can be separately reflected by mirrors $M_2$ and $M_3$. The sides of the medium 19 on which light impinges should include an appropriate anti-reflection coating or they may be cut at the Brewster angle in order to reduce reflection losses.

Referring again to FIG. 2, the difference in mode frequencies $\Delta\nu_m$ should be small enough so that only one, or at the most two, coincident frequencies 21 occur within the oscillation line widths $\Delta\nu_a$. By examination, it can be seen that twice the frequency separation of mode coincidences $\Delta\nu_c$ should be greater than the oscillation bandwidth $\Delta\nu_a$, or $$2\Delta\nu_c > \Delta\nu_a \qquad (1)$$

It is therefore possible to adjust the cavity resonances so that coincidence 21 falls at the frequency of maximum gain of the laser medium, while adjacent mode frequency coincidences lie outside the oscillation bandwidth $\Delta\nu_a$. On the other hand, the difference in mode spacing $\Delta\nu_m$ should be large enough so that oscillation at modes adjacent to a coincidence does not occur. This criterion can be stated as, $$\Delta\nu_m > \Delta\nu_{oc} \qquad (2)$$

where $\Delta\nu_{oc}$ is the cavity width at the desired frequency optical $\nu_o$. As is known, $\Delta\nu_{oc}$ is equal to $\nu_o/Q$ where Q is the figure of merit of the complex optical cavity formed by the primary and auxiliary cavities. Q can be determined by one skilled in the art by conventional optical cavity analysis techniques.

Figure 4:
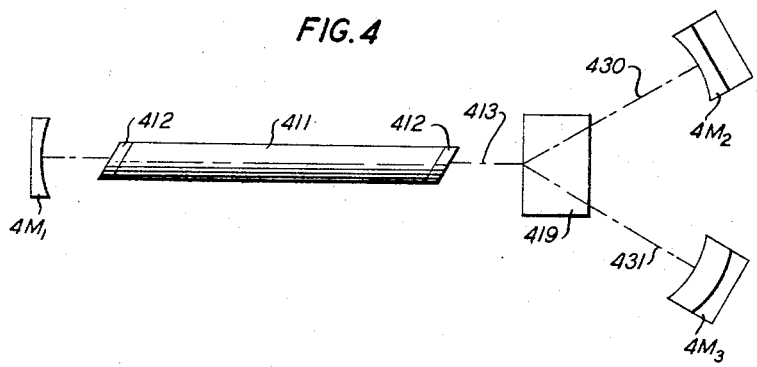
FIG. 4 is a schematic illustration of another embodiment of the invention.

Referring now to FIG. 4 there is shown an alternative embodiment of the invention having elements which correspond to the elements of FIG. 1 and are numbered accordingly except for the insertion of the 4 to designate FIG. 4. Rather than being split by a simple birefringent crystal, the light beam traveling along path 413 is split along paths 430 and 431 by a Wollaston prism 419. As is known, a Wollaston prism is formed by bonding together two birefringent materials having principal axes at 90 degrees with respect to each other. The Wollaston prism splits the light beam into components that diverge at an angle rather than merely being displaced as in the embodiment of FIG. 1. The mirrors $4M_2$ and $4M_3$ are shown as being tilted at angles because the light beam path 431 extends "into the paper" at an angle while the path 430 extends "out of the paper" at an angle.

The principle of operation is the same as the embodiment of FIG. 1; polarized light on path 413 will be split by the Wollaston prism into components having polarization vectors at 90 degrees with respect to each other which will recombine in phase only at frequencies at which the auxiliary cavity formed by mirrors $4M_1$ and $4M_3$ are an integral number of half wavelengths longer than the primary cavity of $4M_1$ and $4M_2$. The principal axes of the Wollaston prism should be at 45 degrees with respect to the light vectors along paths 413 for equal beam splitting along the two component paths. Alternatively, a Rochon prism may be substituted for the Wollaston prism 419. Wollaston and Rochon prisms are described in detail for example, in the book "Concepts of Classical Optics" by Strong, W. H. Freeman and Company, p. 139.

Figure 5:
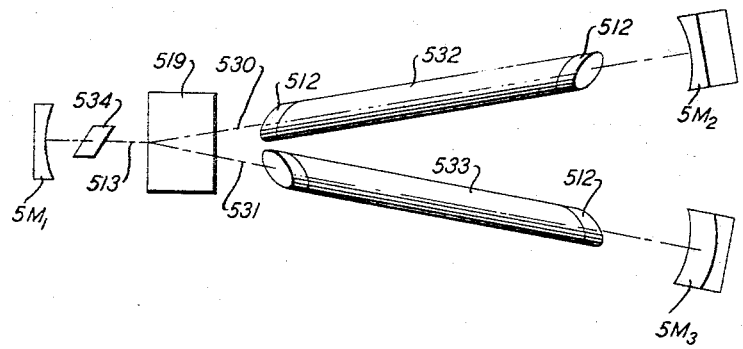
FIG. 5 is a schematic illustration of still another embodiment of the invention.

Because of the wide divergence of the component paths that are attainable by using a Wollaston prism, two lasers, one along each of the component paths, can be used for increasing laser gain as is shown on the embodiment of FIG. 5. Again, the auxiliary cavity formed by mirrors $5M_1$ and $5M_3$ are an integral number of wavelengths longer than the primary cavity of $5M_1$–$5M_2$ at the desired frequency. Located between the mirror $5M_1$ and the Wollaston prism 519 is a Brewster angle window 534 for attenuating light which is recombined out-of-phase at the Wollaston prism 519, as described before. Of course, the windows 512 of the laser mediums 532 and 533 should be tilted at the proper Brewster angle for freely transmitting light of the respective paths 530 and 531. If so desired, a third laser could be included between mirror $5M_1$ and the Wollaston prism 519 for amplifying the light along the central axis path 513.

Figure 6:
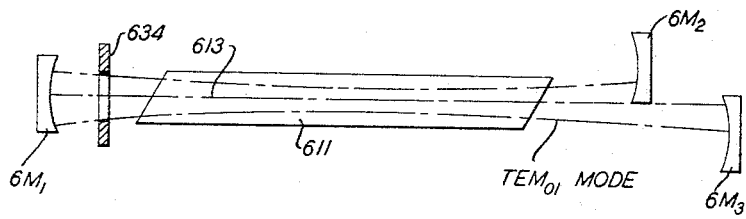
FIG. 6 is a schematic illustration of yet another embodiment of the invention.
Figure 7:
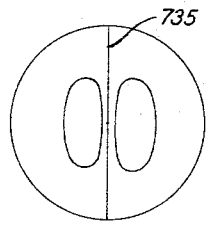
FIG. 7 is an illustration of an odd symmetric transverse electromagnetic mode pattern of the light beam of the apparatus of FIG. 6.

FIG. 6 shows still another embodiment in which beam splitting is accomplished on the basis of mode configuration rather than polarization. Included between the mirror $6M_1$ and the laser medium 611, is an aperture plate 634 having a central aperture which is of precisely the size of the $TEM_{01}$ transverse mode pattern. As before, the mirrors $6M_1$ and $6M_2$ form the primary cavity with mirrors $6M_1$–$6M_3$ forming the auxiliary cavity which is an integral number of half wavelengths longer than the primary cavity. The electric field intensity distribution over the cross section of a light beam of the $TEM_{01}$ mode pattern is shown in FIG. 7. It is characteristic of odd symmetrical mode patterns of this type that a zero field intensity line 735 is established along the diameter of the mode pattern. Referring again to FIG. 6, the mirror $6M_2$ intercepts only half of the cross section of the optical beam and so its lower edge extends along the center line 735 of the mode pattern of FIG. 7. Since this center line is at zero field intensity, the mirror $6M_2$ does not constitute a discontinuity or loss with respect to the $TEM_{01}$ mode. Other mode patterns, however, which have no line of zero field intensity coinciding with the edge of $6M_2$ will "see" a discontinuity or loss in the beam path presented by mirror $6M_2$ and will therefore be attenuated. This embodiment offers advantages of compactness, but requires a precision aperture in plate 634 of precisely the same size as that of the $TEM_{01}$ mode pattern. Further, the lower edge of mirror $6M_2$ must intercept the beam along the center line 735 of the mode pattern which in turn intersects the central axis 613 of the laser medium. The outer diameter of the $TEM_{01}$ mode is a function of mirror radius, mirror spacing, and optical wavelength, as is known in the art.

It is to be understood that the various embodiments presented are intended to be merely illustrative of the principles of the inventive concept. Various other embodiments and modifications may be made by those skilled in the art without departing from the spirit and scope of the invention.

What is claimed is:
1. Laser apparatus comprising:
   a laser medium for radiating coherent light within a predetermined frequency band;
   first and second mirrors defining a primary optical cavity for repeatedly directing the light through the laser medium for cumulative gain;
   a third mirror;
   means comprising a birefringent medium located in the primary optical cavity for directing light of a first linear polarization to the second mirror and for directing light of a second linear polarization to the third mirror;
   the first and third mirrors defining an auxiliary optical cavity which is an integral number of half wavelengths longer than the primary optical cavity at a desired frequency within the predetermined frequency band of the laser medium;
   and means comprising a Brewster angle window located between said first mirror and said birefringent medium for attenuating light energy at frequencies other than those at which both the primary and auxiliary cavities are resonant.

2. The laser apparatus of claim 1 wherein:
   the laser medium defines an optical axis along which light is projected;
   said Brewster angle window is oriented along the optical axis;
   the Brewster angel window inherently provides low loss transmission to linearly polarized light having field vectors extending perpendicularly to the optical axis and being located in a plane that includes the optical axis and the normal to the Brewster angle window;
   and the birefringent medium has a principal axis that is oriented at approximately 45 degrees with respect to said field vectors for splitting the light into approximately equal components.

3. The laser apparatus of claim 1 wherein:
   the laser medium is located between the first mirror and the birefringent medium.

4. The laser apparatus of claim 1 wherein:
   the birefringent medium is a Wollaston prism.

5. The laser apparatus of claim 4 wherein:
   a first laser medium is located between the Wollaston prism and the second mirror and a second laser medium is located between the Wollaston prism and the third mirror.

6. The laser apparatus of claim 1 wherein:

$$2\nu_c > \Delta\nu_a$$

where $\Delta\nu_c$ is the frequency separation of successive primary and auxiliary cavity resonant frequency coincidences, and $\Delta\nu_a$ is said laser medium bandwidth.

7. The laser apparatus of claim 6 wherein:

$$\Delta\nu_m > \Delta\nu_{oc}$$

where $\Delta\nu_m$ is the difference in mode spacing of the primary cavity and the auxiliary cavity, and $\Delta\nu_{oc}$ is the cavity width at the desired frequency.

8. Laser apparatus comprising a laser medium for generating a coherent light beam within a predetermined frequency band and along a central axis;
first and second mirrors defining a primary optical cavity for repeatedly directing light through the laser medium for cumulative gain;
a third mirror;
an aperture plate between the first and second mirrors having an aperture of the same size as that of a higher order odd symmetrical transverse mode at a desired frequency within said frequency band width;
the second mirror intercepting half of the light beam along a diametrical line of the light beam;
the third mirror intercepting the remainder of the light beam;
the first and third mirrors defining an auxiliary optical cavity which is an integral number of half wavelengths longer than the primary cavity.

9. The laser apparatus of claim 8 wherein:
the transverse mode is the $TEM_{01}$ mode.

References Cited

UNITED STATES PATENTS

| | | | |
|---|---|---|---|
| 3,134,837 | 5/1964 | Kisliuk et al. | 331—94.5 |
| 3,187,270 | 6/1965 | Kogelnik et al. | 331—94.5 |
| 3,243,724 | 3/1966 | Vuylsteke | 331—94.5 |

JEWELL H. PEDERSEN, *Primary Examiner.*

V. P. McGRAW, *Assistant Examiner.*